Patented May 26, 1936

2,042,292

UNITED STATES PATENT OFFICE 2,042,292

PROCESS FOR REFINING COPPER ALLOYS

Jesse O. Betterton and Albert J. Phillips, Metuchen, N. J., assignors to American Smelting and Refining Company, New York, N. Y., a corporation of New Jersey No Drawing. Application May 31, 1934, Serial No. 728,307

10 Claims. (Cl. 75—24)

The present invention provides an improved process for salvaging brass and bronze secondary metals and miscellaneous copper alloy scrap to recover the metallic values contained therein, and more particularly provides a process whereby a substantially complete separation of the zinc, tin and lead from the copper may be accomplished.

The usual procedure for salvaging metal values from brass and bronze secondary metals is to melt the charge and blow with air in a converter to remove the volatile metals, namely, zinc, tin and lead, and to subsequently refine the residual blister copper either by the usual fire-refining methods or by electrolytic refining. This blowing operation oxidizes the zinc, tin and lead which are removed from the copper as a mixed dust or fume, and are collected in a baghouse, Cottrell plant, settling chamber, or other means; and while various processes have been proposed for separating the zinc from the lead and tin oxides (for example, by leaching with sulphuric acid), only a partial recovery of these metals is obtained and the cost of the recovery is relatively high.

The present invention has for one of its general objects the providing of an improved process for separating the zinc, tin and lead from the copper contained in brass, bronze and miscellaneous copper alloy scrap.

A further object of the invention is to provide a process wherein the aforesaid separation is accomplished by the production of two general products, namely, a fume containing practically all of the zinc together with about half of the lead, and the other a slag containing practically all of the tin with relatively smaller amounts of lead and larger amounts of copper.

A still further object of the present invention is to provide a process of utilizing the aforesaid slag to produce a further slag in which the tin content is concentrated, this last mentioned slag being treated to effect a separation and recovery of the metal values contained therein in a simple and effective manner.

Other objects of the invention will appear hereinafter, the novel features and combinations being set forth in the appended claims.

In accordance with the present improved process, the secondary brass or bronze is melted in a reverberatory furnace or other suitable melting furnace, and the resulting molten metal is transferred into a converter of standard construction. A small amount of a flux is charged on top of the molten metal. A desirable flux has been found to comprise soda ash, sand and coke, although other fluxing materials may be employed. The converter is rotated and the charge is blown with air in the usual manner, the air supply being controlled, however, so as to substantially completely eliminate the zinc without removing tin to any appreciable extent.

This blowing operation results in a fume which contains practically all of the zinc which was present in the original material and about half of the original lead content. This fume is collected in a baghouse, Cottrell plant, or any other suitable collecting means, and is treated for the recovery of the metallic content thereof. A suitable method of treatment is to smelt the mixed oxide fume with carbon in the presence of a moving reducing atmosphere, which volatilizes all of the zinc, which is recoverable as zinc oxide or blue powder, while by the same operation, the lead oxide is reduced to metallic lead.

After the zinc has been eliminated from the converter charge, as above explained, the accumulated dross or slag is removed from the converter and the refining of the copper in the converter charge is continued by blowing the converter until substantially the entire tin content residual lead and zinc contents of the charge have been formed into a slag. This slag is separated from the residual metal in the converter, which is partially refined or blister copper, it being apparent of course that the slag contains a comparatively large amount of copper resulting from the blowing. The separated slag is returned into the converter during treatment of the succeeding charge of alloy, the slag being added to the converter charge after the completion of the zinc blow.

The introduction of the slag as aforesaid, after the zinc blow, and further blowing of the converter, produced a tin-rich slag in which the tin and copper are present in approximately the ratio of 1:1, there being smaller amounts of lead and zinc also present. This "tin skim" is removed and is subjected to the improved treatment forming the substance of this invention.

In accordance with the present invention, it has been found that markedly improved results are obtained by reducing this tin skim to metal and separating the components of the metal by leaching. It has been found in practice that this treatment of the tin skim offers distinct advantages over direct leaching of the tin skim as it comes from the converter. In this direct leaching operation, difficulty has been experienced owing to the colloidal nature of the components of the tin skim, which causes great difficulty in settling and other troubles in manipulating the leached products.

It has been found that the reduction of the tin skim to metal avoids the above-indicated difficulties, and produces a product which can be readily handled for the ultimate recovery of the values of the material. To this end, in accordance with the present invention, the tin skim from the converter is taken to a cupola or blast furnace, where it is smelted to metal which is found to contain, approximately, one-third tin, one-third copper, slightly less than one-third lead, and small amounts of zinc and iron. It will be evident, of course, that the major part of the zinc is eliminated as fume during the aforesaid reduction, and the bulk of the iron content of the tin skim is eliminated in the slag.

The metal resulting from this smelting operation is an alloy of approximately the above-indicated composition and is found to be in a condition which is readily granulatable and crushable. It is accordingly granulated from the furnace, and crushed and ground in accordance with well-known procedure. The crushed and ground material is roasted, flash roasting being sufficient in many instances and then leached with sulphuric acid. It is found that this leaching of the roasted product proceeds smoothly, and the aforementioned difficulties due to slow-settling and to the colloidal nature of the leached products when direct leaching is carried out, are completely obviated in the present improved operations.

During the leaching, the copper will be converted into soluble copper sulphate, the lead will be converted in part into lead sulphate and the tin will remain as tin oxide. The lead sulphate and tin oxide, being insoluble, will be present together in the residue, together with traces of zinc, copper, and iron. The major portions of the small quantities of zinc, and iron remaining after the smelting will be converted into soluble zinc and iron sulphates.

The copper is recoverable from the sulphate solution by any one of the usual methods, such as by cementation on iron, electrolysis, precipitation as basic sulphate, etc. The unleached residue is convertible by smelting with a suitable flux, such, for instance, as soda ash and sand, to form a solder which upon conventional refining is sold as such.

Among the advantages inherent to the present process which are not afforded by existing methods of direct leaching of copper tin skim, there may be mentioned the fact that mass of material to be handled by the present procedure is practically cut in half. This decreased bulk of material renders the leaching operation very much easier to perform and also the smelting in the furnace removes from the material to be leached the bulk of the silicon and caustic materials, then entering the slag in the furnace, and the presence of which in the material to be leached render the settling and filtering of the residue from the filtrate exceedingly difficult.

Furthermore, the roasting procedure is much easier to carry out on the powdered metal than it is on powdered tin skim, since in the case of the metal, the high heat of oxidation of the metal aids in the progress of the roasting, whereas in the latter case the amount of heat liberated by the conversion of cuprous to cupric oxide is negligibly small and the reaction is not self-perpetuating, making it difficult to obtain a dead roasted product. Also, by removing the zinc from the metal in the form of fume in the blast furnace, sulphuric acid is not consumed by this element during the leaching operation, while the removal of the iron in the slag of the blast furnace results in a decreased amount of "hard head" in the final solder obtained.

While certain novel features of the invention have been disclosed and are pointed out in the annexed claims, it will be understood that various omissions, substitutions and changes may be made by those skilled in the art, and that it is intended to embrace within the scope of this invention such modifications and changes as may be necessary to adapt it to varying conditions and uses.

What is claimed is:

1. The process of refining copper alloys containing zinc and tin for the removal of the zinc and tin therefrom, which comprises melting the alloy, blowing the molten alloy with regulated quantities of air to effect a selective volatilization of the zinc substantially free from tin, continuing to blow the remaining alloy to refine the copper and to produce a slag containing substantially all the tin of the alloy together with relatively large amounts of copper, adding such slag to a subsequent charge of the alloy during refining thereof to produce a concentrated tin slag or tin skim containing smaller amounts of copper than the aforesaid slag, separating the tin skim, smelting the said tin skim to metal, roasting the said metal, leaching the resulting roast, and recovering the metal values from the resulting solution and residue.

2. The process of refining tin skims containing copper, tin and zinc, which comprises smelting the said skims to convert the same to metal with elimination of the major portion of the zinc therefrom, roasting the residual metal thereby rendering the copper in readily leachable form, leaching the resulting roasted product and recovering the metal values from the resulting solution and residue.

3. The process of refining tin skims containing copper, tin, and zinc, which comprises reducing the said skims to metal while eliminating the major part of the zinc, roasting the resulting metal to convert the copper content into a readily leachable form, dissolving the copper so converted, separating the solution from the resulting residue, and treating both the solution and the residue to recover the values therefrom.

4. The process of refining tin skims containing copper, tin, lead and zinc, which comprises reducing the said skims to metal while eliminating the major part of the zinc, roasting the resulting metal thereby converting the copper into a readily leachable form, dissolving the copper from the roasted product, separating the copper solution from the residue containing the tin and lead values, recovering the copper from the copper solution, and converting the tin-lead residue into solder metal.

5. The process of refining tin skims containing copper, tin, lead, and zinc, which comprises charging the said skims into a blast furnace, smelting the skims therein to metal while eliminating substantially all of the zinc therefrom, granulating and crushing the resulting metal, roasting the same, leaching out the copper from the roasted product, leaving the lead and tin as residues, recovering the copper from the resulting copper leach, and converting the lead and tin residues to metal.

6. The process of refining tin skims containing principally copper and tin with or without smaller amounts of lead and zinc, which comprises smelting the skims to metal while eliminating substantially all of the zinc, roasting the resulting metal, and treating the roasted product for recovering the metal values thereof.

7. The process of refining tin skims containing principally copper and tin, with or without smaller amounts of lead, zinc and iron, which comprises smelting the skims to metal in the presence of a flux adapted to eliminate substantially all of the iron as a slag and under conditions enabling substantially complete elimination of the zinc as a fume, roasting the residual metal, leaching the roasted product to separate the copper from the tin and lead, recovering the copper from the resulting solution and reducing the tin and lead residue to metal.

8. The process of refining copper tin skims containing relatively small but appreciable amounts of iron and zinc, which comprises smelting the skims to metal in the presence of agents adapted to slag off substantially all of the iron and under conditions effecting a selective volatilization of substantially all of the zinc with negligible amounts of tin, roasting the resulting metal, and recovering the values thereof from the resulting roasted product.

9. In the refining of tin skims containing copper, tin, lead and zinc, the improvement which comprises smelting the skims to metal while eliminating substantially all of the zinc therefrom, oxidizing said metal and leaching out the copper from the oxidized product leaving the tin and lead as residues adapted to be converted into solder metal.

10. The process of refining tin skims containing copper, tin, lead, zinc and iron which comprises reducing the skims to metal while eliminating the major portion of the zinc and iron as fume and slag respectively, granulating and comminuting the resulting metal, roasting same to convert its constituent metals substantially into oxides, dissolving the copper from the roasted product and recovering copper from the solution and smelting the residue to metal.

JESSE O. BETTERTON.
ALBERT J. PHILLIPS.